UNITED STATES PATENT OFFICE.

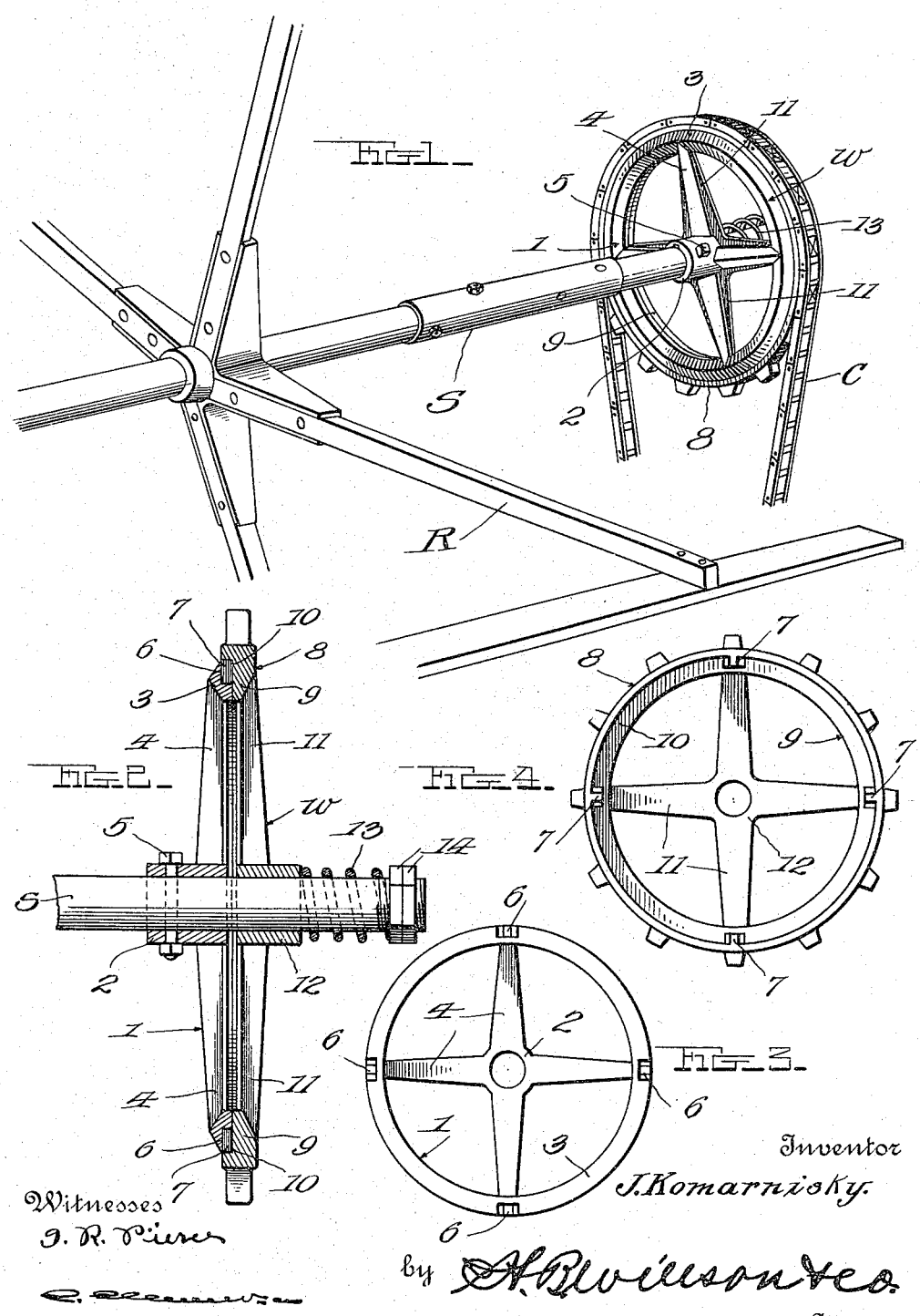

JOSEPH KOMARNISKY, OF JULIAN, MONTANA.

DRIVING-WHEEL FOR GRAIN-REELS.

1,176,967. Specification of Letters Patent. Patented Mar. 28, 1916.

Application filed May 10, 1915. Serial No. 27,128.

*To all whom it may concern:*

Be it known that I, JOSEPH KOMARNISKY, a subject of the Emperor of Austria-Hungary, residing at Julian, in the county of Sheridan and State of Montana, have invented certain new and useful Improvements in Driving-Wheels for Grain-Reels; and I do declare the following to be a full, clear, and exact description of the invention, such as will enable others skilled in the art to which it appertains to make and use the same.

My invention relates broadly to improvements in machine elements and specifically to a driving wheel for the propulsion of grain reels such as those used on self-binders and the like. Heretofore, for this purpose, the shaft of the reel has been provided at one end with a driven sprocket rigidly secured thereto and driven by a sprocket chain. This construction operates to advantage until the reel comes in contact with an obstruction rising from the ground, but when such obstruction is encountered, the sprocket chain continues to drive the reel, thus causing breakage thereof in the majority of cases. It is to overcome this undesirable feature of the present day reel driving means, in a simple and efficient manner, that I have provided the device constituting the gist of the present invention.

With this general object in view, the invention resides in certain novel features of construction and combination hereinafter fully described and particularly pointed out in the appended claim.

In describing the invention, I shall refer to the accompanying drawings wherein one embodiment thereof is illustrated, wherein like reference characters designate the same parts throughout the several views, and wherein:

Figure 1 is a perspective view of a portion of a grain reel equipped with driving means constructed in accordance with the invention; Fig. 2 is a central longitudinal section of one end of the reel shaft and the improved driving wheel thereon; Fig. 3 is a plan view of the fixed section of the wheel; and Fig. 4 is a similar view of the movable section thereof.

In these drawings, constituting a part of the application, R designates a portion of a grain reel such as applied to use upon binders and other types of harvesting machines, this reel including the usual longitudinal driven shaft S to one end of which the wheel W constituting the gist of the present invention is secured, such wheel being here shown in the form of a sprocket, driven by the usual sprocket chain C.

The wheel W, before mentioned, comprises a fixed section 1 having a hub 2, a circular rim 3, and a plurality of spokes 4 integrally united at their ends to said rim and the hub, the latter being keyed upon the end of the shaft S by any preferred type of feather and being additionally locked to said shaft by the bolt 5 which passes therethrough and through said shaft as clearly shown in Fig. 2. At circumferentially spaced points in one of its flat annular sides, the rim 3 is provided with a plurality of cavities 6 having outwardly diverging side walls, these cavities receiving therein projections 7 carried by the movable section 8 of the wheel, said projections having their front and rear faces converging outwardly from the section 8 as clearly shown in Fig. 4.

The previously mentioned wheel section 8 includes an annular rim 9 recessed on one of its flat sides as seen at 10 for the reception of the rim 3 of the section 1 as disclosed in Fig. 2, the rim 9 being connected by spokes 11 formed integrally therewith, to a hub 12, with which said spokes are likewise formed integrally. The hub is rotatably mounted on the shaft S near the end thereof and abuts one end of the coil spring 13 surrounding said end of the shaft, the opposite end of the spring being disposed in contact with the innermost of a pair of nuts 14 disposed on the terminal of the shaft. Thus it will be evident that the tension of the spring 13 is exerted to normally shift the wheel section 8 toward the section 1, thus causing the projections 7 on the former to be received by cavities 6 of the latter, and thus establishing a separable connection between the fixed and movable sections 1 and 8 respectively. Such a connection is essential, since the movable section 8 is driven by the chain C or by the equivalent thereof, thereby through the instrumentality of the projections 7, driving the fixed section 1 and rotating the shaft S with the latter. If now the reel should be brought into contact with an obstruction rising from the ground, the movement of said reel would be checked, whereupon the driven section 8 of the wheel may run idly upon the shaft S. The section 8 is shifted away from the section 1 by the beveled ends of the projections 7, throughout a portion of a revolution, but at intervals throughout such revolution, the projections 7 will be again forced into the cavities 6, thus again establishing a yieldable connection between the driving chain C and the shaft S, which connection is no longer severed until another obstruction is encountered, provided the first obstruction is overcome.

From the foregoing description, taken in connection with the accompanying drawings, it will be evident that although very simple construction has been provided for carrying out the object of the invention, the same will be very efficient in operation and will possess a number of highly advantageous features.

In the illustration, certain specific details of construction are shown for accomplishing the desired results, and in the preceding description these details have been described, but it will be obvious that I need not be limited thereto or to any minor details of construction and proportion, otherwise than to the extent to which the following claim limits me.

I claim:—

A driving wheel of the class described formed of two sections having axially alined hubs and annular rims of different diameter spaced from said hubs, the larger rim being provided with an annular recess in one of its flat sides to receive a smaller rim, said smaller rim having a plurality of circumferentially spaced cavities in the same, a plurality of circumferentially spaced projections on the larger rim disposed in said recess and received by the cavities in the smaller rim, and yielding means for forcing the larger wheel section toward the smaller section.

In testimony whereof I have hereunto set my hand in presence of two subscribing witnesses.

JOSEPH KOMARNISKY.

Witnesses:
PAUL CRUM,
SEHNER OIE.

Copies of this patent may be obtained for five cents each, by addressing the "Commissioner of Patents, Washington, D. C."